United States Patent [19]

Nahon et al.

[11] 4,408,233
[45] Oct. 4, 1983

[54] METHOD AND APPARATUS FOR ACCENTUATING THE FEATURES OF A MONOCHROME IMAGE REPRODUCED BY MEANS OF A DIGITAL TRANSCRIPTION

[75] Inventors: Richard Nahon; Jean-Claude Decuyper, both of Maurepas, France

[73] Assignee: Societe Anonyme dite Compagnie Industrielle des Telecommunications Cit–Alcatel, Paris, France

[21] Appl. No.: 357,541

[22] Filed: Mar. 12, 1982

[30] Foreign Application Priority Data

Mar. 12, 1981 [FR] France .................... 81 04941

[51] Int. Cl.³ .................... H04N 1/40; H04N 5/14
[52] U.S. Cl. .................... 358/284; 358/166
[58] Field of Search .................... 358/284, 166

[56] References Cited

U.S. PATENT DOCUMENTS

| | | |
|---|---|---|
| 3,536,826 | 10/1970 | McMann . |
| 3,814,847 | 6/1974 | Longuet . |
| 3,996,421 | 12/1976 | Pruznick . |
| 4,091,420 | 5/1978 | Omori . |
| 4,210,936 | 7/1980 | Cinque .................... 358/284 |
| 4,258,394 | 3/1981 | Kennedy .................... 358/284 |
| 4,360,830 | 11/1982 | Poetsch .................... 358/166 |
| 4,365,304 | 12/1982 | Ruhman .................... 358/166 |

FOREIGN PATENT DOCUMENTS

| | | |
|---|---|---|
| 1535 | 10/1978 | European Pat. Off. . |
| 2229674 | 6/1972 | Fed. Rep. of Germany . |
| 2080916 | 11/1971 | France . |
| 2188381 | 1/1974 | France . |

OTHER PUBLICATIONS

Rundfunktechnische Mitteilungern vol. 10 No. 5, Oct. 1966, Hamburg (DE) P. Martinez and al: "Neue Schaltungen fur Eine Plumbicon"* Studiokamara (Schwarzweiss)", pp. 247–250 *pp. 249, 250, para 3*.

*Primary Examiner*—Howard Britton
*Attorney, Agent, or Firm*—Sughrue, Mion, Zinn, Macpeak & Seas

[57] ABSTRACT

A method and apparatus for accentuating the features of a monochrome image reproduced by means of a digital transcription.

The apparatus includes an analog portion disposed between the digital-to-analog converter DAC (5) and an analog-to-digital converter (15) with analog sampling units (6,7), comparators (10,11,12), a subtractor (9) an amplifier (13) and a limiter to select and calculate the corrective term depending on the difference and on the digital processing means (17,18,19 and 20) to add the corrective terms to the numbers of the digital transcription.

5 Claims, 2 Drawing Figures

METHOD AND APPARATUS FOR ACCENTUATING THE FEATURES OF A MONOCHROME IMAGE REPRODUCED BY MEANS OF A DIGITAL TRANSCRIPTION

The present invention relates to reproducing a black and white image stored in digital form.

BACKGROUND OF THE INVENTION

Images are transcribed in digital form with as low a definition as possible so as to limit the number of bits used. When an image is transcribed in digital form, it is divided up into as loose a grid as possible of regularly spaced rectangular zones to which digital values are ascribed representing their average tone. When the image is restored, a set of rectangular zones divided up in the same manner is reproduced, with average tones being ascribed to said zones which correspond to said digital values by choosing between various arbitrary graphic configurations which give these same average tones.

The features of an image which coincide with rapid changes in tone do not follow the grid layout used for digital transcription but cut across the zones thereby imparting irregular tones thereto. Since such irregular tones are not taken into account during digital transcription, said features are attenuated on reproduction, thus producing a blurred effect which is one of the main obstacles to reducing definition in a digital image.

The present invention can be used to reduce this defect, in particular in the case where the original image is an image of a face which is transcribed into digital code by means of continuous horizontal line scanning and in which the blurred effect is most particularly noticeable on the vertical features of the profile of the nose against a low contrast background.

SUMMARY OF THE INVENTION

The invention provides a method of accentuating features in a monochrone image, in which said image is scanned as a succession of elementary zones and the grey level of each successive zone is transcribed as a digitally encoded number, wherein a number is selected from the resulting sequence of numbers when said number falls within a predetermined range of mid value greys and when said number differs from the immediately preceding number in the sequence by a non-zero value of absolute amplitude which is lower than a predetermined threshold, and wherein the value of each selected number is modified by adding an accentuation term thereto which is proportional to the difference between the selected number and the immediately preceding number in the sequence, at least over a predetermined range of differences.

When a number is selected the amplitude of the difference is increased by adding said accentuation term to the value thereof.

The present invention also provides an apparatus for putting said method into practice.

BRIEF DESCRIPTION OF THE DRAWINGS

An embodiment of the invention is described with reference to the accompanying drawing in which.

MORE DETAILED DESCRIPTION

Figure 1:
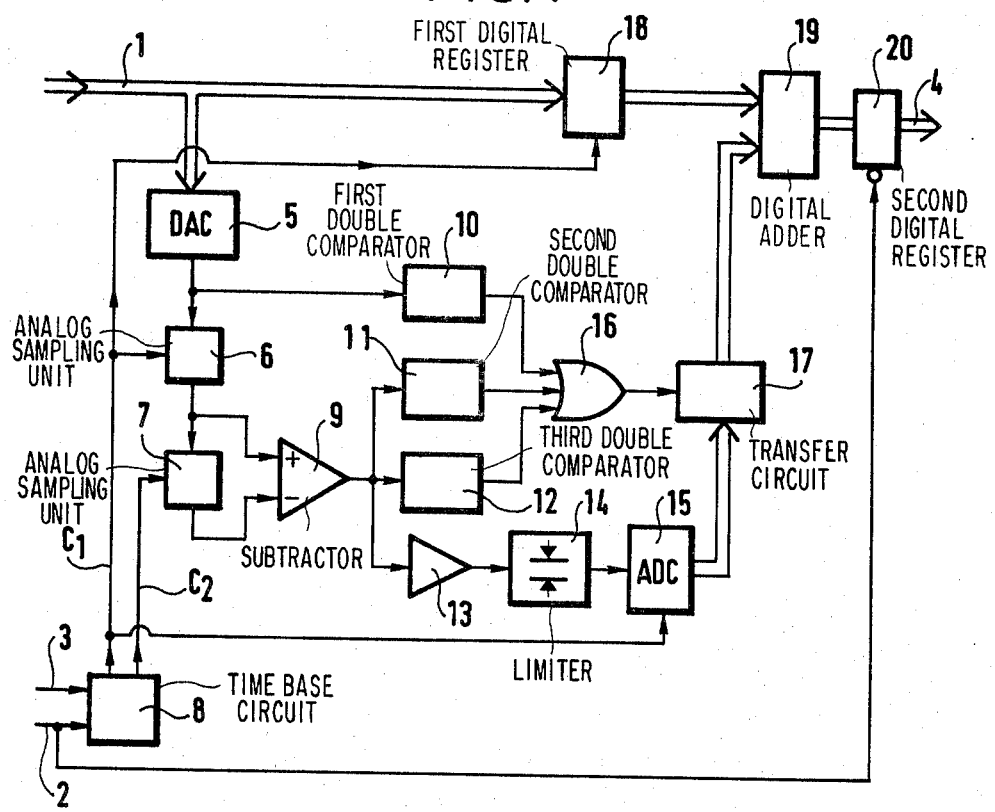
FIG. 1 is a block diagram of accentuation apparatus in accordance with the invention.

The apparatus illustrated in FIG. 1 has a digital input 1 on which it receives successively and synchronously the numbers resulting from a digital image transcription, together with two clock inputs 2 and 3 via which it receives respectively a clock frequency as the rate at which the numbers of the digital transcription arrive and a frequency at twice the clock frequency. The apparatus also has a digital output 4 on which it delivers the numbers of the digital transcription of the image with accentuated features at said clock frequency. The apparatus includes:

a digital-to-analog converter DAC 5 connected to the digital input 1.

Two analog sampling units 6 and 7 which constitute a memory and which are controlled by a time base circuit 8. The sampling unit 6 is connected to the output of the digital-to-analog concerter DAC 5, as it samples the analog output signal therefrom during the second quarter of each time interval during which a number is applied to the digital input 1. The other sampling unit 7 is connected to the output of the preceding sampling unit 6 whose analog output signal it samples during the first quarter of the time interval during which a number is applied to the digital input 1.

An analog subtractor 9 having an adder input connected to the output of the sampling unit 6 and a subtractor input connected to the output of the sampling unit 7.

A first double comparator 10 connected directly to the output of the analog-to-digital converter 5. Said comparator 10 compares the output analog signal from the analog-to-digital converter 5 with first and second threshold values which together delimit a determined range of medium greys, and delivers a binary output signal which is in logic state 0 when the output analog signal from the digital-to-analog converter 5 is within the determined range of medium greys and which is otherwise in logic state 1.

A second double comparator 11 connected to the output from the subtractor 9. Said comparator 11 compares the output analog signal from said subtractor 9 with third and fourth threshold values close to zero, which values define a minimum difference range, and delivers an output binary signal which is in logic state 0 when the analog signal from the subtractor 9 is outside the minimum difference range and which is otherwise in logic state 1.

A third double comparator 12 also connected to the output from the subtractor 9. Said comparator compares the output signal from said subtractor 9 with a fifth and sixth threshold values which define a maximum difference range, and delivers an output binary signal which is in logic state 0 when the analog output signal from the subtractor 9 is inside the maximum difference range and which is otherwise in logic state 1 in the contrary use.

An adjustable gain amplifier 13 also connected to the output from the subtractor 9.

A limiter 14 disposed at the output from the amplifier 13 and limiting the excursion range of the output signal from the amplifier.

An analog-to-digital converter ADC 15 connected to the output from the limiter 14 and controlled by the time base circuit 8 to be active during the second half of each time interval during which a number is applied to the digital input 1.

A logic OR gate 16 with three inputs connected to respective ones of the outputs from the double comparators 10, 11 and 12.

A transfer circuit 17 disposed following an analog-to-digital converter ADC 15 and controlled by the logic OR gate 16 to allow the digital output from the analog-to-digital converter ADC 15 to pass when the output of the logic OR gate 16 is in logic state 0 and to inhibit said signal from passing by replacing it with a zero signal when the output of the logic OR gate 16 is in logic state 1.

A first digital register 18 which stores the number applied to the digital input 1 and which is controlled by the time base circuit 8 in synchronism with the sampling unit 6.

A two input digital adder 19 with one of its inputs connected to the output from the first digital register 18 and with its other input connected to the output from the transfer circuit 17.

And a second digital register 20 placed at the output from the adder 19 and controlled by the clock signal applied to the input 2 (complemented in this case).

Said circuit makes it possible to accentuate the features of an image by reinforcing the differences which exist between consecutive numbers in a digital sequence of a digital image transcription. These differences are reinforced by adding a correction value to a number, the correction value being of the same sign as the difference between said number and the preceding number in the sequence. The correction value may also be proportional to said difference. The correction value is calculated in the circuit for all the numbers of the sequence but it is taken into account only if the number lies in a given range of medium greys and if its difference relative to the preceding number consists of a small but non-zero variation in grey tone between two successive analysis zones representative of a change of tone and consequently of a not very pronounced contour in the mid greys.

The digital image transcription is formed e.g. by a sequence An of binary numbers applied successively to the digital input 1 of the circuit during the successive periods of a clock signal of symmetrical rectangular form applied to the input 2 of the time base circuit 8, the changes in number here occurring e.g. on the descending fronts of the clock signal. The input 3 of the time base circuit 8 also receives a symmetrical rectangular signal at twice the clock frequency and, by logic combination of these two signals, generates two control signals C1, C2 of assymetrical rectangular form and at the clock frequency, one of which, C1, is in the high state during the second half of the low half period of the clock signal, i.e. during the second quarter of the time in which a number is applied to the digital input 1, and the other on which, C2, is in the high state during the first half of the low half period of the clock signal, i.e. during the first quarter of the time in which a number is applied to the digital input 1.

The control signal C1 is applied to control the sampling unit 6 and the register 18 for which the active fronts of said signal are rising fronts and to control the analog-to-digital converter ADC 15 for which the active fronts of said signal are the descending fronts. The control signal C2 is applied to control the sampling unit 7 for which the active fronts of said signal C2 are the rising fronts. It is further specified that the register 20 is sensitive to the rising fronts of the complemented version of the clock signal which controls it.

The clock signal and the control signals C1 and C2 control the sequence of operations carried out by the circuit. Let A(m) be a number applied to the digital input 1 during one period of the clock signal. The first quarter of the time during which the number A(m) is applied to the digital input 1 is used to calculate the corresponding analog value a(m), to check that said value corresponds to a mid range grey tone for which the accentuation circuit is operative and to use the control signal C2 to transfer the analog value a(m−1) of the preceding number A(m−1) into the sampling unit 7. The second quarter of the time during which the number A(m) is applied to the digital input 1 is used by means of the control signal C1, to store the number A(m) in the register 18 and the analog value a(m) of the number A(m) in the sampling unit 6, to calculate the analog value e(m) of the difference between the number A(m) and the preceding number A(m−1);

$$e(m) = a(m) - a(m-1);$$

to check that said difference is not zero but is below a given amplitude limit, calculate a correction term and to limit its amplitude if need be. The second half of the time during which the number A(m) is applied to the digital input 1 is used to convert the correction term into a digital value and to add in the digital correction term to the number A(m) if it is appropriate to do so. The result of the addition is taken into account under the control of the complemented clock signal at the end of the time during which the number A(m) is applied to the digital input 1 and is transmitted to the digital output 4 of the circuit.

The clock frequency is about 10.5 kHz so that a number A(m) is applied during about 95 μs. The digital-to-analog converter DAC 5, e.g. of the current-summing type, supplies the corresponding analog value a(m) after a negligible lapse of time relative to the 95 μs period; said analog value is also tested in a negligible lapse of time by the first double comparator 10. If the shade of grey is outside the range of mid greys to which the feature accentuation process is limited, said first double comparator 10 emits a first signalling pulse in logic state 1 throughout practically the entire time the number A(m) is being applied to the digital input 1.

With five-bit numbers A(m) which make it possible to distinguish thirty-two tones of grey, said range may be limited to a middle range of ten or so tones.

During the first quarter of the time interval in which the number A(m) is applied to the digital input 1, the analog sampling unit 7 takes negligible time to recopy the analog value a(m−1) of the number A(m−1) stored in the analog sampling unit 6 under the control of the control signal C2.

At the very beginning of the second quarter of the time interval during which the number A(m) is applied to the digital input 1, the sampling unit 7 is inhibited by the control signal C2 while the first digital register 18 and the first sampling unit 6 are set in the write state by the control signal C1 and both of them copy the values applied to their inputs (digital in one case, analog in the other) copying taking place in a negligible period of time relative to the 23 μs or so which one quarter of a time interval in which the number A(m) is applied to the digital input 1 lasts.

The analog subtractor 9 delivers the analog value of the difference e(m) also after a negligible lapse of time. Said analog value is tested almost instantaneously by the second double analog comparator 11 which emits a second signalling pulse (logic state 1 at its output) in the case where the amplitude of the difference e(m) is close to zero, indicating that the grey tone is not varying or is varying only very slightly between the two successive elementary image analysis zones which correspond to the numbers A(m−1) and A(m) in the digital transcription. The analog difference e(m) is also tested almost instaneously by the third double analog comparator 12 which emits a third signalling pulse (logic state 1 at its output) in the case where the difference e(m) has a high absolute value which represents a large variation in grey tone which it is useless to accentuate.

Again in a negligible lapse of time, the adjustable gain analog amplifier 13 whose gain is B delivers at its output a correction term B e(m) whose maximum amplitude is limited by the limiter 14.

The analog-to-digital converter ADC 15 is controlled by the control signal C1. It disposes of almost the entire duration of the second half of the time interval in which the number A(m) is applied to the digital input 1, i.e. practically 47 μs, for conversion since it is followed by fast components which operate in a negligible time relative to said duration, and the final result is taken into account only at the end of the second half time interval. The converter ADC 15 may be of the successive approximation type or of the parallel type which is faster. For a five-bit number A(m) with a value lying between 0 and 31, it delivers the correction term (whose amplitude is, for example, limited to 8) in digital form on a parallel output, one of the bits being a sign bit. The conditions imposed on the number A(m) for accentuation are, for example, that said number must lie between 10 and 20 (in a range of 32) and must have a non-zero difference of amplitude less than 8, relative to the number which preceeds it in the sequence.

The digital value of the correction term available on the parallel output of the analog-to-digital converter ADC 15 is applied to the transfer circuit 17 which allows the correction term to pass to the adder 19 if it receives a logic 0 level from the logic OR gate 16 indicating that the digital value A(m) corresponds to a grey tone which complies with the conditions imposed for accentuation. Otherwise it inhibits transfer of any correction value and delivers a zero digital signal in the direction to the adder 19, i.e. if it receives a logic level 1 from the logic OR gate 16 indicating that the digital value A(m) corresponds to a grey tone which does not comply with the conditions imposed for accentuation. The transfer circuit can be formed for example by means of a multiplexer having two parallel inputs, one connected to the output of the analog-to-digital converter ADC 15 and the other being set to logic 0. The multiplexer would also have an addressing input connected to the output of the logic OR gate 16. Alternatively the transfer circuit could be formed by means of a network of logic gates.

The digital adder 19 adds the number present in the first digital register 18 to that which is supplied to it by the trnasfer circuit 17. At the moment when its result is taken into account by the second digital register 20, i.e. at the end of the time interval during which the number A(m) is applied to the digital input 1 of the circuit, the first digital register 18 contains the number A(m) and the transfer circuit 17 delivers the digital value of the correction term to be applied to the number A(m), or zero if the digital value A(m) corresponds to a grey tone which does not comply with the conditions imposed for accentuation. Said adder can be formed by means of a programmed read only memory (ROM).

Figure 2:
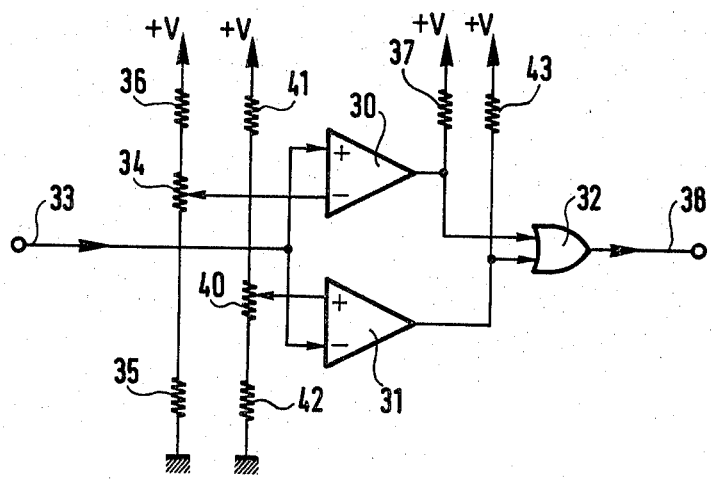
FIG. 2 is a circuit diagram of one of the double comparators used in the apparatus of FIG. 1.

FIG. 2 illustrates an embodiment of the double analog comparator 10. The double comparator has two differential amplifiers 30 and 31 connected as threshold comparators and which control a two-input logic OR gate 32. The non-inverting input of the differential amplifier 30 is connected to the input 33 of the double analog comparator and its inverting input is connected to the slider of a potentiometer 34 whose resistor is connected in series with two fixed resistors 35 and 36 between earth and a +V bias source. The output of said differential amplifier 30 is connected by a resistor 37 to the +V bias source, said amplifier 30 having, for example, an open collector output transistor. The adjustable voltage VA to which its inverting input is set determines the upper limit of the window of the double analog comparator. So long as the level applied to the input 33 of the double analog comparator remains lower than the voltage VA, the output of the differential amplifier 30 is at a zero or a very low potential and delivers a logic 0 level to the input of the logic OR gate 32. As soon as the level applied to the input of the double analog comparator exceeds the voltage VA, the differential amplifier 30 inverts, its output becoming positive and applying a logic 1 level to the input of the logic OR gate 32 which level is transmitted to the output 38 of the double analog comparator. The non-inverting input of the differential amplifier 31 is connected to the slider of a potentiometer 40 whose resistor is connected in series with two resistors 41 and 42 between earth and the +V bias source, the inverting input of said differential amplifier is connected to the input 33 of the double analog comparator, and the output of said differential amplifier is connected by a resistor 43 to the +V voltage source since said amplifier 31 also has an open collector output transistor. The adjustable voltage VB to which its noninverting input is set is chosen to be lower than the adjustment voltage VA and determines the lower limit of the window of the double comparator. So long as the level applied to the input 33 of the double analog comparator remains higher than the voltage VB, the output of the differential amplifier 31 is at a zero or very low potential and delivers a logic 0 level to the input of the logic OR gate 32. As soon as the level applied to the input 33 of the double analog comparator becomes lower than the voltage VB, the differential amplifier 31 inverts, its output becoming positive and applying a logic 1 level to the input of the logic OR gate 32 which level is transmitted at the output 38 of the double analog comparator.

The circuit of FIG. 2 can be modified so as to form a double analog comparator of the same type as the one referenced 12 in FIG. 1 which compares the signal applied to its input with two thresholds of opposite polarity instead of with two positive thresholds as in the case of the comparator 10 of FIG. 1. To do this, it is necessary merely to connect the resistor of the potentiometer 40 whose slider is connected to the non-inverting input of the differential amplifier 31 in series with the two resistors 41 and 42 between earth and a −V bias source instead of connecting these three resistors in series between earth and the +V bias source.

The circuit of FIG. 2 can also be modified simply so as to form a double analog comparator of the same type as the one referenced 11 in FIG. 1 and which not only compares the signal applied to its input with two thresholds of opposite polarities but also generates an output signal whose significance is the opposite of that of the output signals of the comparators 10 and 12 in FIG. 1. To do this, besides the same modification as described for the comparator 12, it is necessary merely to replace the logic OR gate 32 with a logic NOR gate.

Without going beyond the scope of the invention, some dispositions can be modified or some means can be replaced by equivalent means.

We claim:

1. A method of accentuating features in a monochrome image, comprising the steps of scanning said image as a succession of elementary zones and transcribing the grey level of each successive zone as a digitally encoded number, the improvement comprising selecting a number from the resulting sequence of numbers when said number falls within a predetermined range of mid value greys and when said number differs from the immediately preceding number in the sequence by a non-zero value of absolute amplitude which is lower than a predetermined threshold, modifying the value of each selected number by adding an accentuation term thereto which is proportional to the difference between the selected number and the immediately preceding number in the sequence, at least over a predetermined range of differences.

2. An apparatus for accentuating features in a monochrome image, which involves the steps of scanning said image as a succession of elementary zones and transcribing the grey level of each successive zone as a digitally encoded number, and further including selecting a number from the resulting sequence of numbers when said number falls within a predetermined range of mid value greys and when said number differs from the immediately preceding number in the sequence by a non-zero value of absolute amplitude which is lower than a predetermined threshold, modifying the value of each selected number by adding an accentuation term thereto which is proportional to the difference between the selected number and the immediately preceding number in the sequence, at least over a predetermined range of differences with said apparatus operating on the basis of a digital transcription formed by a sequence of successively available numbers, said apparatus comprising:

first comparator means for comparing each number received with a first threshold value and with a second threshold value which delimit said predetermined range of mid greys and for deliverying a first signalling pulse each time the number received is outside said range of average greys;

storage means for storing each number received over a period at least equal to that which separates the reception of two successive numbers;

subtractor means for determining the value of the difference between each number received and the immediately preceding number stored by the storage means;

second comparator means for comparing the value of said difference with third and fourth threshold values close to zero which define a minimum difference range and for delivering a second signalling pulse each time the value of said difference is within said minimum difference range;

third comparator means for comparing the value of said difference with fifth and sixth threshold values which define a maximum difference range and for delivering a third signalling pulse each time said difference is outside said maximum difference range;

amplifier means for multiplying the value of said difference by a weighting coefficient and for obtaining said accentuation term; and processing means for delivering the numbers at the rate at which they are received, either non-modified or increased by an accentuation term according to whether or not a signalling pulse is applied by any of said comparator means.

3. An apparatus according to claim 2, wherein the processing means include an adder with a first input to which the numbers received are applied and with a second input to which either zero or said accentuation terms are applied via a transfer circuit controlled by the signalling pulses, the data input of said transfer circuit receiving the accentuation terms which it transmits to its output when it is enabled by the fact that there are no signalling pulses and the output of said transfer circuit generating a zero number when it is inhibited by the fact that there is a signalling pulse.

4. An apparatus according to claim 2 in which said processing means are digital while said comparator memory, subtractor and amplifier means are analog means, wherein said apparatus further includes:

digital-to-analog conversion means at the input in front of the first comparator means and of the memory means; and analog-to-digital conversion means at the output of the amplifier means.

5. An apparatus according to claim 4, further including limiter means for receiving the output from the amplifier means to limit the maximum amplitude of the accentuation term.

* * * * *